3,239,538
Patented Mar. 8, 1966

3,239,538
2,2-DICHLORO-3(2H)-FURANONES AND THE PREPARATION OF ARYL-PYRUVIC ACID THEREFROM
Angelo John Speziale, Creve Coeur, and Lowell R. Smith, St. Louis, Mo., assignors to Monsanto Company, St. Louis, Mo., a corporation of Delaware
No Drawing. Filed May 10, 1965, Ser. No. 454,636
15 Claims. (Cl. 260—347.7)

This application is a continuation-in-part of copending application Serial No. 229,990, filed October 11, 1962, now abandoned.

This invention relates to new and useful 2,2-dichloro-3(2H)-furanones of the formula $$O=C-C-(O)_n-R$$
$$Cl_2-C\diagdown_O\diagup C-N\diagup$$

wherein $n$ is a number from 0 to 1, wherein R is an aromatic radical and wherein $-N{<}$ is a secondary amine $$-N\diagup$$

residue. These materials are pre-emergent herbicides for broad leaf and/or narrow leaf plants. Additionally those of the foregoing formula wherein $n$ is 0 are useful in preparing substituted pyruvic acids of the formula $$R-CH_2-C-C-OH$$
$$\quad\quad\quad\; \|\;\|$$
$$\quad\quad\quad\; O\;O$$

wherein R has the aforedescribed significance by the mineral acid hydrolysis thereof.

The said 2,2-dichloro-3(2H)-furanones are prepared from oxalyl chloride and an α-substituted acetamide of the formula $$R-(O)_n-CH_2-C-N\diagup$$
$$\quad\quad\quad\quad \|$$
$$\quad\quad\quad\quad O$$

wherein R and $n$ have the aforedescribed significance and wherein $-N{<}$ is a secondary amine residue, e.g. a $$-N\diagup$$

(1) Saturated single ring heterocyclic amine residue of the formula $$\overset{A}{\frown}N-$$

wherein A is $-CH_2CH_2OCH_2CH_2-$, $-CH_2CH_2SCH_2CH_2-$ or alkylene of from 4 to 10 carbon atoms and having from 4 to 6 carbon atoms in a continuous chain between the valence bonds, or a
(2) Secondary amine residue of the formula $$-N\diagup^M_G$$

wherein M and G are like or unlike hydrocarbyl radicals having 1 to 10 carbon atoms such as the various aryl, alkaryl, aralkyl or alkyl radicals or said hydrocarbyl radicals having at least one substituent such as lower alkoxy, chlorine or bromine. As illustrative of such radicals are methyl, ethyl, propyl, butyl, amyl, octyl, decyl, benzyl, phenethyl, phenbutyl, phenyl, naphthyl, tolyl, xylyl, ethylphenyl, propyltolyl, butylphenyl, and the various isomeric forms thereof, methoxyethyl, ethoxyethyl, propoxyethyl, methoxyphenyl, ethoxyphenyl, diethoxyphenyl, chloroethyl, chlorobutyl, dichloropropyl, trichlorobutyl, ar-chlorobenzyl, ar-dichlorobenzyl, ar-dichlorophenethyl, chlorophenyl, ar-chlorotolyl, chloronaphthyl, dichlorophenyl, trichlorophenyl, bromoethyl, bromoamyl, bromophenyl, dibromophenyl, tribromophenyl, bromodichlorophenyl, ar-chloroanisyl, ar-chlorophenetyl, and the various isomeric forms thereof.

The aforesaid 2,2-dichloro-3(2H)-furanones are prepared by reacting oxalyl chloride with an α-substituted acetamide of the aforedescribed formula wherein R is an aromatic hydrocarbyl (a) radical having 6 to 12 carbon atoms, e.g. phenyl, tolyl, xylyl, ethylphenyl, propylphenyl, propyltolyl, butylphenyl, hexylphenyl, biphenylyl, naphthyl, methylnaphthyl and said aromatic hydrocarbyl (a) having at least one chlorine or bromine substituent or mixtures thereof on the aromatic carbocyclic nucleus thereof. As illustrative of operable α-substituted acetamide reactants are N-(phenoxyacetyl) morpholine,
N-(naphthoxyacetyl) morpholine,
N-(m-tolyloxyacetyl) morpholine,
N-(phenoxyacetyl) pyrrolidine,
N-(phenoxyacetyl) piperidine,
N-(3,5-xylyloxyacetyl) piperidine,
N-(phenoxyacetyl) alphapipecoline,
N-(phenoxyacetyl) betapipecoline,
N-(phenoxyacetyl) gammapipecoline,
N-(phenoxyacetyl) alpha, gammalutidine,
N-(phenoxyacetyl) 2,4-dimethylpyrrolidine,
N-(phenoxyacetyl) 3-ethyl-4-methylpiperidine,
N-(phenoxyacetyl) 4-isobutylpiperidine,
N-(phenoxyacetyl) 3-butyl-2-methylpiperidine,
N-(phenoxyacetyl) hexamethyleneimine,
N-(4-chlorophenoxyacetyl) hexamethyleneimine,
N,N-dimethyl alphaphenoxyacetamide,
N,N-dimethyl alpha-(4-biphenyloxy)acetamide,
N,N-dimethyl alpha-(4-chlorophenyloxy) acetamide,
N,N-diethyl alphaphenoxyacetamide,
N-ethyl-N-methyl alphanaphthoxyacetamide,
N,N-di-n-butyl alphaphenoxyacetamide,
N,N-diisoamyl alpha-(2,4-dichlorophenoxy)acetamide,
N,N-di-n-decyl alphaphenoxyacetamide,
N-methyl-N-phenyl alphaphenoxyacetamide,
N-methyl-N-benzyl alphaphenoxyacetamide,
N-ethyl-N-p-tolyl alphaphenoxyacetamide,
N,N-dibenzyl alphaphenoxyacetamide,
N,N-di-betaphenethyl alpha-(3,5-xylyloxy)acetamide,
N,N-diphenyl alphaphenoxyacetamide,
N,N-dinaphthyl alphaphenoxyacetamide,
N-ethyl-N-naphthyl alphaphenoxyacetamide,
N,N-di(ethoxyethyl) alphaphenoxyacetamide,
N,N-di(2-chloroethyl) alphaphenoxyacetamide,
N,N-di(4-chlorophenyl) alphaphenoxyacetamide,
N,N-di(2,4-dichlorophenyl) alphaphenoxyacetamide,
N-methyl-N-4-chlorophenyl alpha-(4-biphenyloxy) acetamide,
N-methyl-N-(3-bromo-4-anisyl) alphaphenoxyacetamide,
N-ethoxyethyl-N-(2-chloro-4-bromophenyl) alphaphenoxyacetamide,
etc., and are
N-(phenacetyl) morpholine,
N-(naphthacetyl) morpholine,
N-(m-tolylacetyl) morpholine,
N-(phenacetyl) pyrrolidine,
N-(phenacetyl) piperidine,
N-(3,5-xylylacetyl) piperidine,
N-(phenacetyl) alphapipecoline,
N-(phenacetyl) betapipecoline,
N-(phenacetyl) gammapipecoline,
N-(phenacetyl) alpha, gammalutidine,
N-(phenacetyl) 2,4-dimethylpyrrolidine,
N-(phenacetyl) 3-ethyl-4-methylpiperidine, N-(phenacetyl) 4-isobutylpiperidine,
N-(phenacetyl) 3-butyl-2-methylpiperidine,
N-(phenacetyl) hexamethyleneimine,
N-(4-chlorophenacetyl) hexamethyleneimine,
N,N-dimethyl alphaphenacetamide,
N,N-dimethyl alpha-(4-biphenyl)acetamide,
N,N-dimethyl alpha-(4-chlorophenyl)acetamide,
N,N-diethyl alphaphenacetamide,
N-ethyl-N-methyl alphanaphthacetamide,
N,N-di-n-butyl alphaphenacetamide,
N,N-diisoamyl alpha-(2,4-dichlorophen)acetamide,
N,N-di-n-decyl alphaphenacetamide,
N-methyl-N-phenyl alphaphenacetamide,
N-methyl-N-benzyl alphaphenacetamide,
N-ethyl-N-p-tolyl alphaphenacetamide,
N,N-dibenzyl alphaphenacetamide,
N,N-di-betaphenethyl alpha-(3,5-xylyl)acetamide,
N,N-diphenyl alphaphenacetamide,
N,N-dinaphthyl alphaphenacetamide,
N-ethyl-N-naphthyl alphaphenacetamide,
N,N-di(ethoxyethyl) alphaphenacetamide,
N,N-di(2-chloroethyl) alphaphenacetamide,
N,N-di(4-chlorophenyl) alphaphenacetamide,
N,N-di(2,4-dichlorophenyl) alphaphenacetamide,
N-methyl-N-4-chlorophenyl alpha-(4-biphenyl)acetamide,
N-methyl-N-(3-bromo-4-anisyl) alphaphenacetamide,
N-ethoxyethyl-N-(2-chloro-4-bromophenyl) alphaphenacetamide, etc.

While the oxalyl chloride acid and the α-substituted acetamide reactant theoretically react in a molar ratio of 2:1 an excess of either reactant can be employed where and when desired, e.g. 1.5 to 2.5 moles of oxalyl chloride per mole of α-substituted acetamide. While a wide range of reaction temperatures can be employed provided the reaction system is fluid (i.e. maintained at a temperature above the freezing point of the system up to and including the system's boiling point) reaction temperatures in the range of 0° C. to 100° C. are preferred. Where and when desired the reaction can be conducted in the presence of an inert organic liquid or solvent such as methylene chloride, 1,2-dichloroethane, chloroform, carbon tetrachloride, hexane, octane, etc.

The aforedescribed substituted pyruvic acids are obtained by hydrolyzing the aforedescribed 2,2-dichloro-3(2H)-furanones of the foregoing formula wherein $n$ is 0 in the presence of dilute mineral acid such as hydrochloric acid, hydrobromic acid, and the like. The amount of water present to conduct the hydrolysis will be at least three moles per mole of the 2,2-dichloro-3(2H)-furanone, however to increase the rate of hydrolysis amounts up to 25 moles of water per mole of 2,2-dichloro-3(2H)-furanone can be employed. The amount of mineral acid in the anhydrous form can vary widely but usually will be in the weight range of 5 parts to 20 parts per 100 parts of water. While a wide range of reaction temperatures can be employed provided the reaction system is fluid (i.e. maintained at a temperature above the freezing point of the system up to and including the system's boiling point) reaction temperatures in the range of 5° C. to 100° C. are preferred. Where and when desired the reaction can be conducted in the presence of an inert organic liquid or solvent such as methylene chloride, 1,2-dichloroethane, chloroform, carbon tetrachloride, hexane, octane, etc.

The overall mechanics involved in the synthesis can be represented as follows:

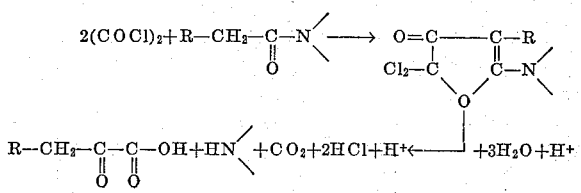

As illustrative of the instant invention is the following:

EXAMPLE I

To a suitable reaction vessel equipped with an agitator, thermometer and reflux condenser is charged 19.1 parts by weight (substantially 0.1 mole) of N,N-diethyl alphaphenacetamide and approximately 140 parts by weight of methylene chloride. While maintaining the so-charged mass at about 0° C. and with agitation 25.4 parts by weight (substantially 0.2 mole) of oxalyl chloride is added dropwise. Upon completion of the oxalyl chloride addition the reaction mass is agitated at room temperature for about three hours. The reaction mass is then evaporated under reduced pressure. The solid residue is dissolved in acetone and treated with charcoal. The mass is cooled to 5° C. and the addition of water separated a tan solid. Recrystallization of this solid from acetone-water yielded 17.2 parts by weight of 5-diethylamino-2,2-dichloro-4-phenyl-3(2H)-furanone, M.P. 119–121° C. *Analysis.*—Theoretical 4.67 N, 23.62% Cl. Found 4.76 N, 23.65 % Cl.

EXAMPLE IA

To a suitable reaction vessel equipped with an agitator is charged 8.0 parts by weight of 5-diethylamino-2,2-dichloro-4-phenyl-3(2H) - furanone, approximately 80 parts by weight of acetone and approximately 100 parts by weight of 10% by weight hydrochloric acid. The so-charged mass is heated to the reflux temperature and refluxed for 24 hours. The resultant mass is extracted with diethyl ether, and the extract washed with saturated aqueous sodium bicarbonate until carbon dioxide ceased evolving. The wash is then acidified with 12N HCl and then extracted with diethyl ether. The ether extract is dried over anhydrous magnesium sulfate. The dried solution is evaporated to half its volume. The addition of hexane precipitated a white solid which on recrystallization from a hexane-diethylether mixture gave phenyl-pyruvic acid, M.P. 154–155° C., which agrees with an authentic sample of phenyl-pyruvic acid.

EXAMPLE II

Employing the procedure of Example I but replacing N,N-diethyl alphaphenacetamide with an equimolecular amount of N - (1 - naphthylacetyl) hexamethyleneimine there is obtained 5-hexamethyleneimino-2,2-dichloro-4-(1-naphthyl)-3-(2H)-furanone. This material on hydrolyzing in accordance with the procedure of Example IA yields (1-naphthyl)-pyruvic acid.

EXAMPLE III

Employing the procedure of Example I but replacing N,N-diethyl alphaphenacetamide with an equimolecular amount of N-ethyl-N-(4-chlorophenyl) alphaphenacetamide there is obtained 5-(N-ethyl-N-4-chlorophenylamino)-2,2-dichloro-4-phenyl-3(2H)-furanone. This material on hydrolyzing in accordance with the procedure of Example IA yields phenyl-pyruvic acid.

EXAMPLE IV

Employing the procedure of Example I but replacing N,N-diethyl alphaphenacetamide with an equimolecular amount of N,N-di(2-ethoxyethyl) alpha-p-tolylacetamide there is obtained 5-di(2-ethoxyethyl)amino-2,2-dichloro-4-(4-tolyl)-3(2H)-furanone. This material on hydrolyzing in accordance with the procedure of Example IA yields (4-tolyl)-pyruvic acid.

EXAMPLE V

Employing the procedure of Example I but replacing N,N-diethyl alphaphenacetamide with an equimolecular amount of N-methyl-N-ethyl alpha-(2,4-dichlorophen) acetamide there is obtained 5-(N-methyl-N-ethylamino)-2,2-dichloro-4-(2,4 - dichlorophenyl - 3(2H) - furanone. This material on hydrolyzing in accordance with the procedure of Example IA yields (2,4-dichlorophenyl)-pyruvic acid.

EXAMPLE VI

Employing the procedure of Example I but replacing N,N-diethyl alphaphenacetamide with an equimolecular amount of N-(phenacetyl) morpholine there is obtained 5-(4-morpholino)-2,2-dichloro-4-phenyl-3(2H)-furanone.

EXAMPLE VII

Employing the procedure of Example I but replacing N,N-diethyl alphaphenacetamide with an equimolecular amount of N-isopropyl-N-(3-chlorophenyl) alphaphenacetamide there is obtained 5-(N-isopropyl-N-3-chlorophenylamino)-2,2-dichloro-4-phenyl-3(2H)-furanone.

EXAMPLE VIII

Employing the procedure of Example I but replacing N,N-diethyl alphaphenacetamide with an equimolecular amount of N,N-diphenyl alphaphenacetamide there is obtained 5-diphenylamino-2,2-dichloro-4 - phenyl - 3(2H)-furanone. This material on hydrolyzing in accordance with the procedure of Example IA yields phenyl-pyruvic acid.

EXAMPLE XI

Employing the procedure of Example I but replacing N,N-diethyl alphaphenacetamide with an equimolecular amount of N,N-dibenzyl alphaphenacetamide there is obtained 5-(N,N-dibenzylamino)-2,2-dichloro - 4 - phenyl-3(2H)-furanone.

EXAMPLE X

Employing the procedure of Example I but replacing N,N-diethyl alphaphenacetamide with an equimolecular amount of N-methyl-N-phenyl alphaphenacetamide there is obtained 5-(N-methyl-N-phenylamino)-2,2-dichloro-4-phenyl-3(2H)-furanone.

EXAMPLE XI

Employing the procedure of Example I but replacing N,N-diethyl alphaphenacetamide with an equimolecular amount of N,N-dimethyl alpha-(4-bromo-2-methylphenyl)acetamide there is obtained 5-(dimethylamino)-2,2-dichloro-4-(4-bromo-2-methylphenyl)-3(2H) - furanone. This material on hydrolyzing in accordance with the procedure of Example IA yields (4-bromo-2-methylphenyl)pyruvic acid.

EXAMPLE XII

Employing the procedure of Example I but replacing N,N-diethyl alphaphenacetamide with an equimolecular amount of N-methyl-N-phenyl alpha-(2,4-dichlorophenyl) acetamide there is obtained 5-(N-methyl-N-phenylamino)-2,2-dichloro - 4 - (2,4 - dichlorophenyl) - 3(2H)-furanone.

EXAMPLE XIII

Employing the procedure of Example I but replacing N,N-diethyl alphaphenacetamide with an equimolecular amount of N-methyl-N-phenyl alpha-(4-methylphenyl) acetamide there is obtained 5-(N-methyl-N-phenylamino)-2,2-dichloro-4-(4-methylphenyl)-3(2H) - furanone (M.P. 161-162.5° C.).

EXAMPLE XIV

Employing the procedure of Example I but replacing N,N-diethyl alphaphenacetamide with an equimolecular amount of N,N-diethyl alpha-(3,4-dichlorophenyl) acetamide there is obtained 5-diethylamino-2,2-dichloro-4-(3,4-dichlorophenyl)-3(2H)-furanone. This material on hydrolyzing in accordance with the procedure of Example IA yields (3,4-dichlorophenyl) pyruvic acid.

EXAMPLE XV

Employing the procedure of Example I but replacing N,N-diethyl alphaphenacetamide with an equimolecular amount of N-methyl-N-phenyl alphaphenoxyacetamide there is obtained 5-(N-methyl-N-phenylamino)-2,2-dichloro-4-phenoxy-3(2H)-furanone (M.P. 109–111° C.).

EXAMPLE XVI

Employing the procedure of Example I but replacing N,N-diethyl alphaphenacetamide with an equimolecular amount of N,N-diethyl alphaphenoxyacetamide there is obtained 5-(N,N-diethylamino)-2,2 - dichloro-4-phenoxy-3(2H)-furanone (M.P. 95.5–96.5° C.).

EXAMPLE XVII

Employing the procedure of Example I but replacing N,N-diethyl alphaphenacetamide with an equimolecular amount of N-methyl-N-phenyl alpha-(2,4-dichlorophenoxy)acetamide there is obtained 5 - (N - methyl-N-phenylamino) - 2,2 - dichloro - 4 - (2,4-dichlorophenoxy)-3-(2H)-furanone (M.P. 152–154° C.).

EXAMPLE XVIII

Employing the procedure of Example I but replacing N,N-diethyl alphaphenacetamide with an equimolecular amount of N-(phenoxyacetyl) morpholine there is obtained 5-(4-morpholino)-2,2-dichloro-4-phenoxy-3(2H)-furanone.

EXAMPLE XIX

Employing the procedure of Example I but replacing N,N-diethyl alphaphenacetamide with an equimolecular amount of N-isopropyl-N-(3-chlorophenyl) alphaphenoxyacetamide there is obtained 5-(N-isopropyl-N-3-chlorophenylamino)-2,2-dichloro-4-phenoxy-3(2H)-furanone.

EXAMPLE XX

Employing the procedure of Example I but replacing N,N-diethyl alphaphenacetamide with an equimolecular amount of N,N-diphenyl alphaphenoxyacetamide there is obtained 5-diphenylamino-2,2-dichloro-4-phenoxy-3(2H)-furanone.

As aforementioned the 2,2-dichloro-3(2H)-furanones are effective pre-emergent herbicides. For example at an application rate to soil of 25 pounds per acre, respectively, (1) the product of Example I exhibited complete control of narrow leaf plants such as crab grass and foxtail, (2) the product of Example XV exhibited complete control of crab grass, foxtail and pigweed, (3) the product of Example VIII exhibited complete control of sugar beet, pigweed, radish and morning glory, (4) the product of Example XVI exhibited complete control of sugar beet and pigweed, and (5) the product of Example XVII which was particularly outstanding in the complete control of sugar beet, foxtail, crab grass, pigweed, soybean and tomato.

Of the 2,2-dichloro-3(2H)-furanones of this invention those of the formulae $$\begin{array}{c} O=C\text{------}C-(O)_n-\diagup\diagdown \\ | \quad\quad\quad || \\ Cl_2-C\quad\quad C-N-M \quad\quad (CH_2)_mH \\ \diagdown O \diagup \quad G \end{array}$$

and $$\begin{array}{c} O=C\text{------}C-(O)_n-(\text{chloro substitued phenyl}) \\ | \quad\quad\quad || \\ Cl_2-C\quad\quad C-N-\text{phenyl} \\ \diagdown O \diagup \quad | \\ \quad\quad\quad CH_3 \end{array}$$

where $m$ and $n$, respectively, are numbers from 0 to 1, wherein M and G, respectively, are alkyl having from 1 to 10 carbon atoms, and wherein chloro substituted phenyl has from 1 to 3 chlorine substitutes are particularly useful in the pre-emergent control of noxious vegetation.

While this invention has been described with respect to certain embodiments it is to be understood that it is not so limited and that variations and modifications thereof obvious to those skilled in the art can be made without departing from the spirit or scope of this invention.

What is claimed is:
1. A compound of the formula

$$\begin{array}{c} O=C\text{————}C-(O)_n-R \\ | \quad \quad \quad \| \\ Cl_2-C \quad \quad C-N< \\ \diagdown O \diagup \end{array}$$

wherein R is hydrocarbyl having from 6 to 12 carbon atoms and selected from the group consisting of (a) phenyl, alkyl substituted phenyl, biphenylyl, naphthyl, and methylnaphthyl, and (b) said hydrocarbyl (a) being substituted on the aromatic carbocyclic nucleus thereof with substituents of the class consisting of chlorine and bromine, wherein $n$ is a number from 0 to 1, and wherein $-N<$ is a secondary amine residue selected from the group consisting of a (1) Saturated single ring heterocyclic amine residue of the formula $$A\underset{\smile}{\frown}N-$$

wherein A is selected from the group consisting of $-CH_2CH_2OCH_2CH_2-$, $-CH_2CH_2SCH_2CH_2-$, and alkylene of the 4 to 10 carbon atoms and having from 4 to 6 carbon atoms in a continuous chain between the valence bonds, and a (2) Secondary amine residue of the formula $$-N\diagup^{M}_{\diagdown G}$$

wherein M and G are selected from the group consisting of (3) Hydrocarbyl having from 1 to 10 carbon atoms selected from the group consisting of alkyl, phenyl substituted alkyl, phenyl, alkyl substituted phenyl, and naphthyl, and (4) Said hydrocarbyl (3) being substituted with a member of the class consisting of lower alkoxy, chlorine and bromine.

2. A compound of the formula $$\begin{array}{c} O=C\text{————}C-\text{phenyl}(CH_2)_mH \\ | \quad \quad \quad \| \\ Cl_2-C \quad \quad C-N-M \\ \diagdown O \diagup \quad | \\ \quad \quad \quad \quad G \end{array}$$

wherein $m$ is a number from 0 to 1 and wherein M and G respectively are alkyl having from 1 to 10 carbon atoms.

3. A compound of the formula $$\begin{array}{c} O=C\text{————}C-(\text{chloro substituted phenyl}) \\ | \quad \quad \quad \| \\ Cl_2-C \quad \quad C-N-\text{phenyl} \\ \diagdown O \diagup \quad | \\ \quad \quad \quad \quad CH_3 \end{array}$$

wherein chloro substituted phenyl has from 1 to 3 chlorine substituents.

4. A compound of the formula $$\begin{array}{c} O=C\text{————}C-O-\text{phenyl}(CH_2)_mH \\ | \quad \quad \quad \| \\ Cl_2-C \quad \quad C-N-M \\ \diagdown O \diagup \quad | \\ \quad \quad \quad \quad G \end{array}$$

wherein $m$ is a number from 0 to 1 and wherein M and G respectively are alkyl having from 1 to 10 carbon atoms.

5. A compound of the formula $$\begin{array}{c} O=C\text{————}C-O-(\text{chloro substituted phenyl}) \\ | \quad \quad \quad \| \\ Cl_2-C \quad \quad C-N-\text{phenyl} \\ \diagdown O \diagup \quad | \\ \quad \quad \quad \quad CH_3 \end{array}$$

wherein chloro substituted phenyl has from 1 to 3 chlorine substituents.

6. 5 - diethylamino - 2,2 - dichloro - 4 - phenyl - 3(2H)-furanone.

7. 5 - (N-methyl - N - phenylamino)-2,2-dichloro-4-(4-methylphenyl)-3(2H)-furanone.

8. 5 - (N-methyl-N-phenylamino)-2,2-dichloro-4-(2,4-dichlorophenoxy)-3(2H)-furanone.

9. 5 - diethylamino - 2,2 - dichloro-4-phenoxy-3(2H)-furanone.

10. 5 - (N - methyl - N - phenylamino)-2,2-dichloro-4-phenoxy-3(2H)-furanone.

11. The method of making a compound of the formula $$\begin{array}{c} O=C\text{————}C-(O)_n-R \\ | \quad \quad \quad \| \\ Cl_2-C \quad \quad C-N< \\ \diagdown O \diagup \end{array}$$

wherein $n$ is a number from 0 to 1, wherein R is hydrocarbyl having 6 to 12 carbon atoms and selected from the group consisting of (a) phenyl, alkyl substituted phenyl, biphenylyl, naphthyl, and methylnaphthyl, and (b) said hydrocarbyl (a) being substituted on the aromatic carbocyclic nucleus thereof with substituents of the class consisting of chlorine and bromine, and wherein $-N<$ is a secondary amine residue selected from the group consisting of a (1) Saturated single ring heterocyclic amine residue of the formula $$A\underset{\smile}{\frown}N-$$

wherein A is selected from the group consisting of $-CH_2CH_2OCH_2CH_2-$, $-CH_2CH_2SCH_2CH_2-$, and alkylene of from 4 to 10 carbon atoms and having from 4 to 6 carbon atoms in a continuous chain between the valence bonds, and a (2) Secondary amine residue of the formula $$-N\diagup^{M}_{\diagdown G}$$

wherein M and G are selected from the group consisting of (3) Hydrocarbyl having 1 to 10 carbon atoms selected from the group consisting of alkyl, phenyl substituted alkyl, phenyl, alkyl substituted phenyl, and naphthyl, and (4) Said hydrocarbyl (3) being substituted with a member of the class consisting of lower alkoxy, chlorine and bromine, which comprises reacting oxalyl chloride with an α-substituted acetamide of the formula $$R-(O)_n-CH_2-C-N\diagup_{\diagdown} \\ \quad \quad \quad \| \\ \quad \quad \quad O$$

wherein R, $n$ and $-N<$ have the same significance as above.

12. The method of claim 11 attended by the step of hydrolyzing the 2,2-dichloro-3(2H)-furanone product thereof wherein $n$ is 0 in the presence of a mineral acid to an aryl-pyruvic acid of the formula $$R-CH_2-C-C-OH \\ \quad \quad \| \quad \| \\ \quad \quad O \quad O$$

wherein R has the same significance as in claim 11.

13. The method of making phenyl-pyruvic acid which comprises hydrolyzing a 2,2,4-trichloro-3(2H)-furanone of the formula $$\begin{array}{c} O=C\text{————}C-\text{phenyl} \\ | \quad \quad \quad \| \\ Cl_2-C \quad \quad C-N-M \\ \diagdown O \diagup \quad | \\ \quad \quad \quad \quad G \end{array}$$

wherein M and G respectively are alkyl having 1 to 10 carbon atoms in the presence of a mineral acid.

14. The method of making a compound of the formula $$\begin{array}{c} O=C\text{————}C-(O)_n-(\text{chloro substituted phenyl}) \\ | \quad \quad \quad \| \\ Cl_2-C \quad \quad C-N-\text{phenyl} \\ \diagdown O \diagup \quad | \\ \quad \quad \quad \quad CH_3 \end{array}$$

wherein $n$ is a number from 0 to 1 and wherein chloro substituted phenyl has from 1 to 3 chlorine substituents which comprises reacting oxalyl chloride with an α-substituted acetamide of the formula

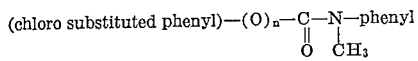

wherein $n$ and chloro substituted phenyl have the aforedescribed significance.

15. The method of making a compound of the formula

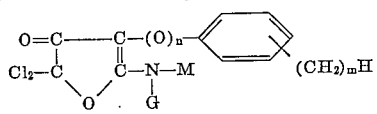

wherein $m$ and $n$, respectively, are numbers from 0 to 1 and wherein M and G, respectively, are alkyl having from 1 to 10 carbon atoms which comprises reacting oxalyl chloride with an α-substituted acetamide of the formula

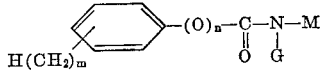

wherein $m$, $n$, M and G have the aforedescribed significance.

No references cited.

NICHOLAS S. RIZZO, *Primary Examiner.*